Aug. 8, 1950  W. W. CUSHMAN ET AL  2,517,545
APPARATUS FOR TESTING BALLS
Filed Feb. 20, 1946  2 Sheets-Sheet 1
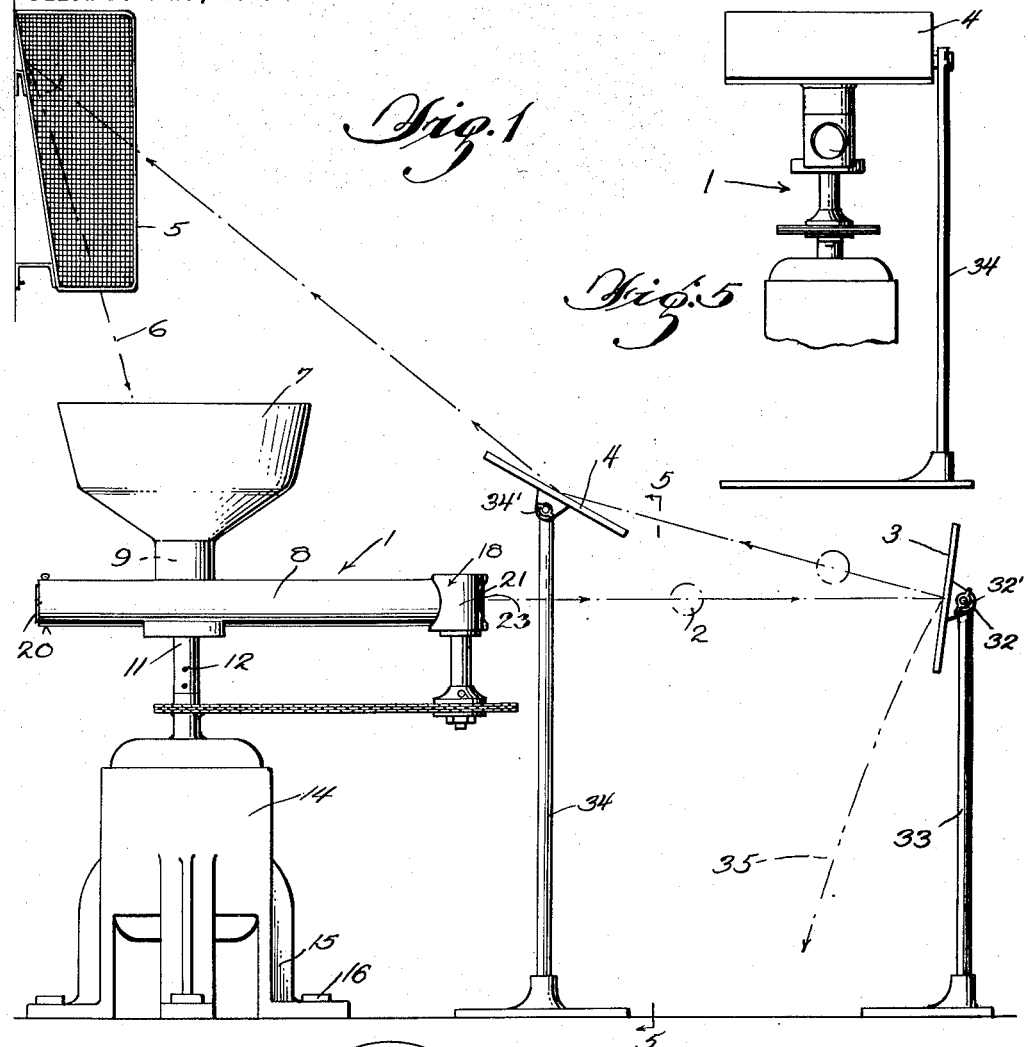
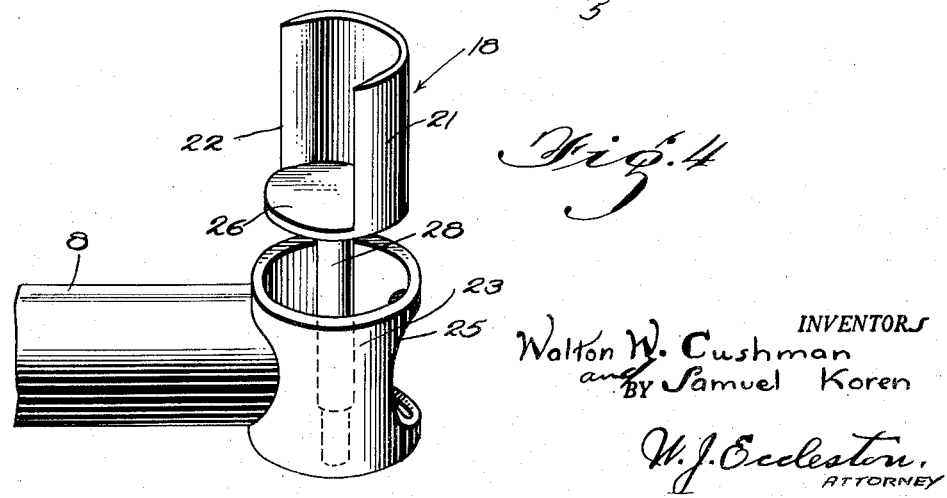
INVENTORS
Walton W. Cushman
and Samuel Koren
BY
W. J. Eccleston,
ATTORNEY

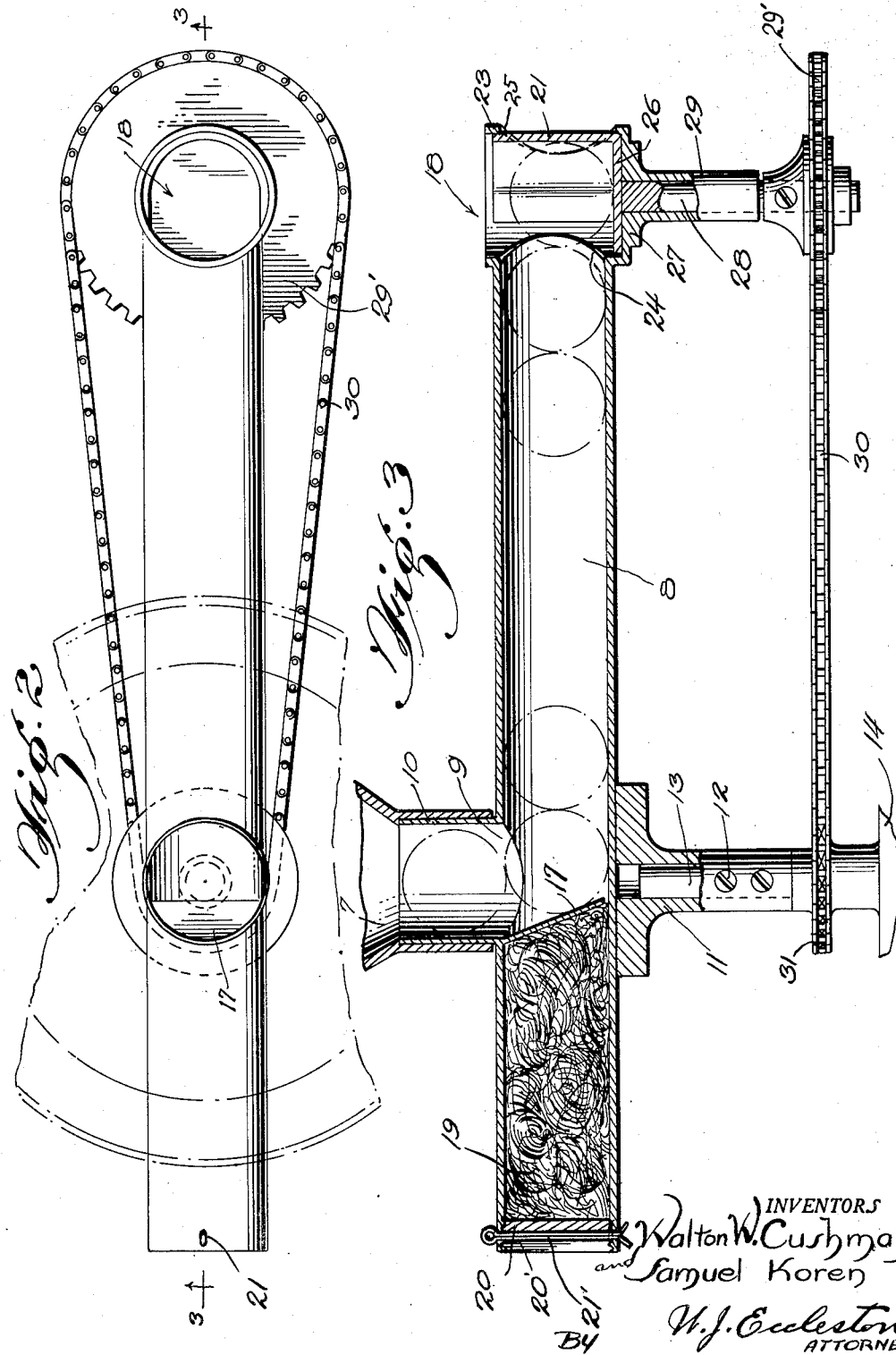

UNITED STATES PATENT OFFICE 2,517,545

APPARATUS FOR TESTING BALLS

Walton W. Cushman, Webb City, Mo., and Samuel Koren, Silver Spring, Md.; said Koren assignor to the United States of America as represented by the Secretary of War Application February 20, 1946, Serial No. 649,105

3 Claims. (Cl. 73—13)

(Granted under the act of March 3, 1883, as amended April 30, 1928; 370 O. G. 757)

The invention described herein, if patented, may be manufactured and used by or for the Government for governmental purposes, without the payment to us of any royalty thereon.

This invention relates to an apparatus for testing balls, and more particularly, to an apparatus for testing the durability and resiliency of balls, normally subject to impact, such as table tennis balls.

An object of this invention is to provide an apparatus for testing a plurality of balls simultaneously by subjecting such balls in succession to impact treatment similar to that received during an actual game so that after a given period of time of testing, each of the balls will have received the same treatment it would have received over the same period of time of actual play.

It is a further object of this invention to provide an apparatus for testing balls, normally subject to periodic impact, having means for periodically placing the ball in flight and impacting the ball at time intervals with forces corresponding to forces of actual use.

Still another object of this invention is to provide an apparatus for testing the durability and resiliency of table tennis balls providing means for impelling balls under centrifugal force against one or more backboards and means for automatically recirculating the balls to repeat the cycle at time intervals corresponding to table tennis volley.

Other objects and advantages of the present invention will appear in the following detailed description and particularly will be pointed out in the appended claims, reference being had to the accompanying drawings forming part of this specification, and in which:

Figure 1 is an elevational view of the apparatus embodying this invention and showing its mode of operation;

Figure 2 is a plan view of part of the apparatus showing the major part of the ball-impelling mechanism;

Figure 3 is a sectional view of the impelling mechanism taken on line 3—3 of Figure 2, and with part of the mechanism shown in elevation;

Figure 4 is an exploded view of a fragmentary detail showing the discharge mechanism of the impelling mechanism; and Figure 5 is a sectional view taken on line 5—5 of Figure 1, showing the position of the deflecting board relative to the impelling mechanism.

Referring to the drawings, and particularly Figure 1, 1 represents generally the impelling mechanism for impelling balls successively at periodic intervals substantially horizontally through space as indicated by the ball in flight, in position 2. The balls strike the board or plate 3 and rebound toward the deflecting board 4, which bounces the ball into net 5, from whence the balls fall freely, indicated by arrow 6, into the impelling mechanism to repeat the cycle.

The impelling mechanism comprises the hopper 7 which is suitably fixed to a horizontally extending hollow impelling tube 8, for feeding the balls through opening 9 into the tube 8. As shown, the tube 8 has fixed thereto a tubular guide 10, shown in Figure 3, surrounding opening 9, to which the hopper 7 is fixed, but it is within the scope of this invention to fasten the hopper 7 to tube 8 by any suitable means to feed balls through opening 9 into the tube.

The tube 8 is fixed to a supporting bracket 11 which is adapted to be fastened by means of set-screws 12 to a motor shaft 13 driven by a conventional synchronous motor; for example, an 1800-R. P. M. motor housed in housing 14. The motor housing 14 may be provided with supporting legs 15 to carry the impelling assembly. The impelling assembly may be fixed permanently to a table or floor, or may be bolted by bolts 16 to a platform for portability. As seen in the drawings, the bracket 11, motor shaft 13 and hopper 7 are in axial vertical alignment so that as the motor is driven, the impelling tube 8 and hopper 7 are rotated as a unit about the vertical axis of the hopper.

As shown in Figures 2 and 3, the impelling tube 8 is provided with a baffle 17 to direct the balls toward the discharge end, the right end of the tube as seen in Figures 2 and 3. As the tube 8 rotates about a vertical axis at 1800 R. P. M., the series of balls are carried by centrifugal force to the discharge mechanism 18, to be described hereinafter. The opposite end of tube 8 is filled with lead wool 19 for static balance and the end is closed off by a threaded retainer plug 20 which is locked in position by any suitable means; for example, by means of the cotter pin 21' passing through openings in the tube and a groove 20¹ in the plug 20.

The discharge mechanism 18 consists of a cutaway sleeve 21, provided with a lateral opening 22 and rotatable about its own axis and housed in a short vertically extending tubular member 23 welded or otherwise securely fixed to the horizontal tube 8. The tubular member 23 is provided with an inlet opening 24 (shown in Figure 3) communicating with the tube 8 and a diametrically opposite outlet opening 25. The lower end of the sleeve 21 is closed off by a disc 26 which provides a receptacle therewith for a single ball. The bottom 27 of tubular member 23, as shown in Figure 3, provides a bearing on which the sleeve 21 with disc 26 are free to rotate as a unit. A vertically extending shaft 28 is fixed to the center of the disc 26 and extends downwardly through a bearing sleeve 29 forming an extension of the bottom 27. To the lower end of shaft 28 is fixed a sprocket 29¹ which is driven by a sprocket chain 30, actuated by a stationary sprocket 31, rigidly affixed to the motor housing 14 and non-rotatable.

The board or plate 3 has an adjustable pivotal connection 32 to a suitable supporting stand 33 so that the angle of board 3 can be varied to vary the angle at which balls strike and rebound therefrom. The board 3 is fixed in adjusted position by a wing nut 32¹. The stand 33 is movable to adjust its position. The deflecting board 4 is similarly pivotally and adjustably connected to supporting stand 34 by means of a wing nut 34¹. The stand 34 is offset, as shown in Figure 5, so as not to interfere with balls discharged from the impelling mechanism 1. The angle of the board 4 may be adjusted and fixed in adjusted position by wing nut 34¹ to vary the angle of striking and bouncing therefrom. The stand 34 is movable for adjustment of position of board 4. The fabric net 5 is suitably supported on a wall or on a stand in an adjustable manner. The net 5 deadens the flight of the ball and insures that the balls are directed into the hopper 7.

As the balls circulate and recirculate through the apparatus, they strike board 3 at a low angle of incidence and rebound at almost 90° from the board and receive a heavy impact, thus simulating a head-on paddle stroke in a table tennis game. The balls strike board 4 at a large angle of incidence (low angle to the board) and receive a lighter impact and bounce, simulating an impact of a ball bouncing on a tennis table at a low angle. The fabric net 5 deadens the ball, without impact, for dropping into hopper 7 without any additional impact or with only inconsequential impact. The ball, being impelled from the discharge mechanism 18 by centrifugal force, receives little, if any, impact at that point. Thus, as the apparatus is operated to impel and impact and bounce a succession of balls under test, the durability and resiliency or bouncing ability of the balls can be studied. If any ball should become defective during the test run, it will not rebound or bounce, or will rebound or bounce inaccurately, from boards 3 or 4 and will fall to the floor as denoted, for example, by the arrow 35. Thus, if fifteen balls are placed in the machine for testing together, the number of balls falling to the floor over a given period of time will be a measure of the durability and resiliency and bouncing quality of the balls. Also, a number of balls of different manufacture (for example, fifteen balls) can be tested simultaneously to determine which is the most durable.

In operation, as the balls are fed into hopper 7, they move down to the discharge end of tube 8 by centrifugal force and abut each other in a single line, as shown by dotted lines in Figure 3. As the tube 8 rotates, due to the sprocket and chain mechanism 29¹, 30 and 31, sleeve 21 rotates about its own axis in synchronism with the rotation of tube 8 and when the cut-out 22 of sleeve 21 is in alignment with tube 8 the outermost ball is forced into sleeve 21 by centrifugal action. Continued rotation of tube 8 and sleeve 21 will eventually result in sleeve 21 rotating to a position wherein cut-out 22 is in alignment with outlet opening 25. At that moment, the ball in sleeve 21 is ejected under centrifugal force toward board 3 while the remaining balls in tube 8 are retained by the sleeve 21. Thus the sleeve 21 acts as a valve to release a ball periodically in synchronism with the rotation of tube 8.

In the particular embodiment illustrated, sprocket 29¹ has a four-to-one ratio to sprocket 31 and thus for every four revolutions of tube 8 the sleeve 21 will rotate once to discharge a single ball. If the motor used is an 1800-R. P. M. motor, making 30 revolutions per second, the sleeve 21 will make 7½ revolutions per second, thus discharging balls at the rate of 7½ balls per second. Thus the balls will be discharged and returned to the hopper at the rate of 7½ balls per second, and therefore two seconds will be required to complete the cycle for the fifteen balls. If the machine is operated continuously, each and every ball will be discharged and returned to complete a cycle every two seconds. Thus, every two seconds a ball will be impelled to strike board 3, rebound to deflecting board 4, bounce to net 5, drop into the hopper 7, and move to its initial position. In the case of table tennis balls, the ball impinging against board 3 can be likened to a paddle striking the ball almost head-on, and the ball impinging against board 4 at a low angle of approach can be likened to the ball striking and bouncing off a table tennis table. Then when the ball again impinges against board 3 two seconds later, it can be likened to the opponent's paddle stroke, and when it again bounces off board 4, it can be likened to the next succeeding bounce, and so on.

Thus it is apparent that the apparatus of this invention has means for impacting a ball heavily head-on and subsequently lightly a glancing blow to correspond to a paddle stroke and a bounce, and that the apparatus can be timed to correspond to paddle strokes and bounces of an actual game; for example, a paddle stroke every two seconds for each ball, which may be considered the approximate time which ordinarily elapses between strokes in a table tennis game. It is apparent that a method for testing balls has been provided which includes the steps of impacting balls heavily and/or lightly and at such time intervals to simulate actual playing conditions, inherent in games such as table tennis, tennis, squash, etc.

It is of course obvious that by changing the sprocket ratio of sprockets 29¹ and 31 the time interval can be increased or decreased as desired. It might be preferable to adjust the timing for a time interval of one second to simulate conditions in a fast table tennis game. Also, if a different motor, for example a 900-R. P. M. motor, is used the sprocket ratio can be changed to a two-to-one ratio to allow for a discharge of one ball for every two revolutions of tube 8, or again, 7½ balls per second, to maintain the two-second time interval when fifteen balls are used.

For the purpose of testing, a discharge velocity of approximately 150 feet per second has been found desirable. To effect this speed with an 1800-R. P. M. motor, the horizontal distance from the axis of the hopper 7 to the discharge outlet should be approximately 9½ inches. For a 900-R. P. M. motor this distance should be about 19 inches. It is, of course, within the scope of this invention to use higher or smaller discharge velocities by changing the motor speed and/or the horizontal distance between the axis of the hopper and the discharge outlet.

Though the above description refers to using fifteen balls in the machine, it is within the scope of this invention to test a greater or lesser number at one time.

It is evident that an apparatus has been devised which subjects a ball to almost the exact type of treatment it normally would receive during a game of table tennis as to paddle stroke and table bounce. Also, the timing of impacts is such as to correspond to that of table tennis so that operating the apparatus for any given period will correspond to a playing time of the same period. Thus, operating the apparatus for one hour will correspond to each ball's being subjected to one hour of playing time. When fifteen balls are tested, the operation for one hour is equivalent to fifteen games, each of one hour's duration.

Although the apparatus illustrated is arranged with the impelling mechanism 1 having a vertical axis of rotation, it is obviously within the scope of this invention to arrange the impelling mechanism 1 to rotate about a horizontal axis. In this embodiment, the opening 9 would be in a vertical plane instead of in a horizontal plane and a stationary chute could be used, instead of hopper 7, to direct returning balls into opening 9.

Though the above description is with special reference to testing table tennis balls, it is to be understood that other types of balls, which receive impact during play, may be tested. As indicated above, the time interval for a cycle can be varied to conform to the time conditions of the game involved. Also, the time between impacts against board 3 and board 4 can be varied by adjusting the positions of stands 33 and/or 34. Thus, adjustments can be made to conform more nearly to the time intervals between different impacts of actual play. Also, the material of board 3 and board 4 can be varied, depending on the type of ball being tested. For example, for table tennis balls, board 3 may consist of rubber-covered plywood, and board 4 may consist of plywood. Also, if only one impact is desired during each cycle, board 4 can be eliminated and net 5 moved to receive and guide the ball into hopper 7. It is to be understood that the apparatus is designed and operated to subject a ball to treatment over a period of time as closely as possible to the kind of treatment it would receive during the same period of time of actual play. For example, one hour of continuous operation of the machine would be equivalent to one hour of playing time for each of the balls being tested.

While the invention has been described in more or less detail, it is not to be limited thereby, as changes may be made in the form, arrangement and construction of parts, and equivalents may be substituted, without departing from the spirit and scope of the invention as claimed, the form hereinbefore described being merely a preferred embodiment thereof.

We claim:

1. In an apparatus for testing the durability and resiliency of balls, the combination of a tube for receiving the balls, means for rotating said tube in a horizontal plane about an axis at right angles to the axis of the tube whereby the balls are directed to, and discharged from the outer end of the tube by centrifugal force, a rotatable discharge valve at the outer end of the tube for controlling the direction of discharge of the balls, and means for rotating said valve in synchronization with the rotation of said tube.

2. In an apparatus for testing the durability and resiliency of balls, the combination of a tube for receiving the balls, means for rotating said tube in a horizontal plane about an axis at right angles to the axis of the tube whereby the balls are directed to, and discharged from the outer end of the tube by centrifugal force, a rotatable discharge valve at the outer end of the tube for controlling the direction of discharge of the balls, means for rotating said valve in synchronization with the rotation of said tube, means for impacting discharged balls, and means for returning said impacted balls to the tube.

3. In an apparatus for testing the durability and resiliency of balls, the combination of a tube for receiving the balls, means for rotating said tube in a horizontal plane about an axis at right angles to the axis of the tube whereby the balls are directed to, and discharged from the outer end of the tube by centrifugal force, a rotatable discharge valve at the outer end of the tube for controlling the direction of discharge of the balls, means for rotating said valve in synchronization with the rotation of said tube, means for impacting discharged balls, and means for returning said impacted balls to the tube, said means including a funnel communicating with the interior of the tube at its center of rotation.

WALTON W. CUSHMAN.
SAMUEL KOREN.

REFERENCES CITED

The following references are of record in the file of this patent:

UNITED STATES PATENTS

| Number | Name | Date |
|---|---|---|
| 1,198,300 | Watkins | Sept. 12, 1916 |
| 1,636,234 | Klopsteg | July 19, 1927 |

FOREIGN PATENTS

| Number | Country | Date |
|---|---|---|
| 486,533 | Great Britain | June 7, 1938 |
| 548,424 | Germany | Apr. 12, 1932 |